May 2, 1950     H. M. OLTZ     2,506,101
MIXING MECHANISM FOR DISPENSING FREEZERS
Filed Nov. 13, 1947
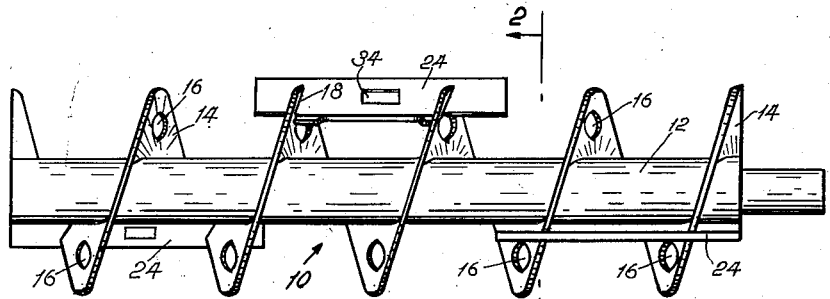
Fig. 1
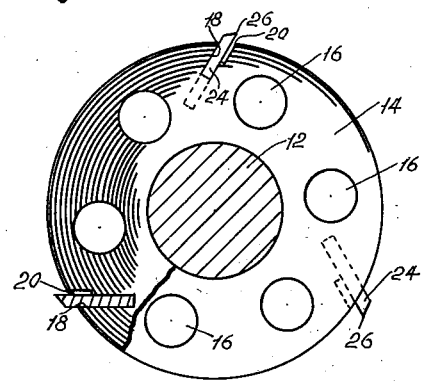
Fig. 2
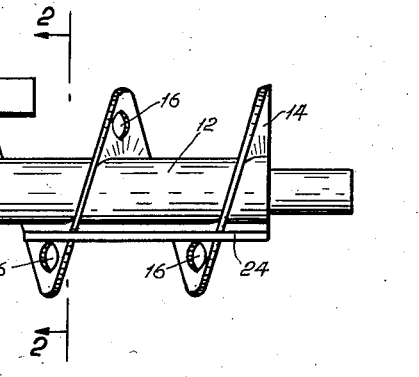
Fig. 3
Fig. 5
Fig. 6
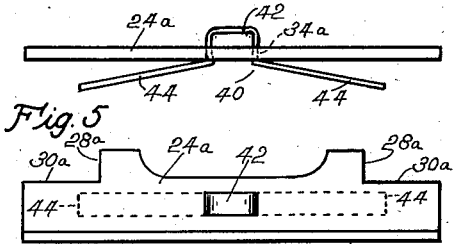
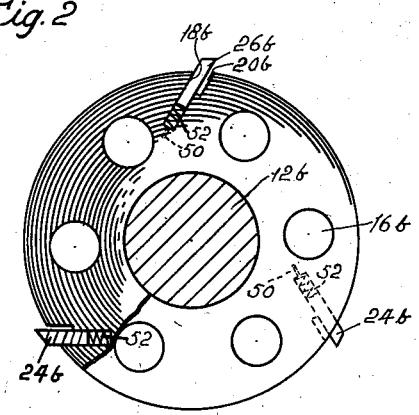
Fig. 8
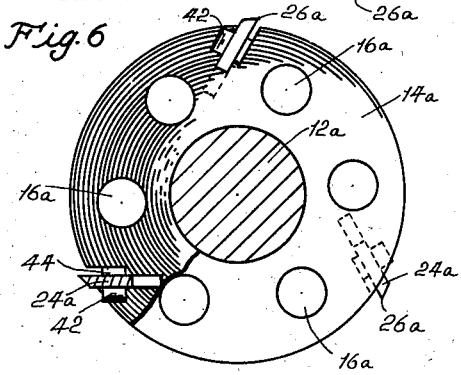
Fig. 4
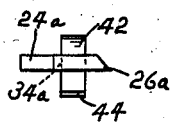
Fig. 7
HARRY M. OLTZ
INVENTOR.
BY Leon T. Hooper
ATTORNEY.

Patented May 2, 1950

2,506,101

UNITED STATES PATENT OFFICE 2,506,101

MIXING MECHANISM FOR DISPENSING FREEZERS

Harry M. Oltz, Miami, Fla.

Application November 13, 1947, Serial No. 785,682

6 Claims. (Cl. 259—134)

This invention relates to improvements in dispensing freezer construction and more especially to the rotating mixing mechanism within the body of such a freezer. The mechanism is adapted to be used in the type of a freezer shown and described in my Patent No. 2,080,971, issued May 18, 1937.

In using machines for manufacturing and dispensing frozen dairy products to the general public strict codes and rules pertaining to sanitation require periodic cleaning, steaming or scalding and the like of the machine and parts thereof. If the machines in use may be easily dismantled and reassembled, the cleaning work is greatly facilitated. On the other hand if parts of the machine are not readily accessible or may be dismantled only with difficulty, cleaning becomes a haphazard affair. Quite often the cleaning of the hard to remove parts is not properly done and as a result a contaminated product is passed on to the purchasing public.

One of the essentials of an efficient machine of this kind is a means for removing the frozen mix from the interior wall of the freezer in order that it may be commingled with the unfrozen contents and also because the frozen mix adhering to the wall retards freezing by functioning as an insulator.

Accordingly it is one of the principal objects of the present invention to provide a simple and efficient mixing and extruding mechanism for a dispensing freezer which mechanism may be easily and quickly dismantled for cleaning and may be readily reassembled without the aid of special tools and equipment.

It is a further object of importance and advantage to provide a mechanism having a limited number of associated parts and to have such parts designed and constructed in such a manner that all parts and surfaces thereof are readily accessible for washing and cleaning.

Still another object of advantage and importance resides in the provision of means for detachably securing a plurality of scraper blades to the revolvable mixing mechanism. The blades are arranged in overlapping relation to assure prompt removal of the frozen mix from the entire interior wall of the freezer.

A further object of importance is the provision of means for urging the scraper blades toward the interior wall of the freezing chamber of the freezer when the apparatus is in operation.

Additional objects of importance and advantage will become apparent as the following detailed description progresses, reference being had to the accompanying drawing, wherein:

Figure 1 is an elevational view of a mixing and extruding mechanism for a dispensing freezer.

Figure 2 is a slightly enlarged vertical section of the structure taken on line 2—2 of Figure 1 and looking in the direction indicated by the arrows.

Figure 3 is a top plan view of one of the scraper blades.

Figure 4 illustrates a slightly modified embodiment of the apparatus wherein spring means, attached to the blades, are utilized to assist in maintaining the blades in working position.

Figure 5 is an elevational view of a blade with a spring member attached thereto.

Figure 6 is a top plan view of the structure shown in Figure 5.

Figure 7 is an end view of the blade shown in Figures 5 and 6, and

Figure 8 is a vertical section similar to Figures 2 and 4 and shows a further modified embodiment.

The reference numeral 10 indicates generally a mixing and extruding mechanism for a dispensing freezer. The mechanism 10 includes a shaft 12 to the peripheral surface of which a helical fin 14 is suitably attached. The convolutions of the fin 14 are regularly spaced one from another, as is clearly shown in the drawing, and are concentric with the shaft 12. See Figures 1 and 2.

Formed in the helical fin 14 at suitable locations is a plurality of apertures 16 through which the mix or frozen product may pass when the machine is in operation. In passing through the apertures 16 the product is thoroughly mixed and in addition thereto a damaging head or pressure is prevented from forming at the discharge end of the machine. Formed in the peripheral edge of the helical fin 14 is a plurality of scraper receiving slots 18. The slots 18 are arranged in longitudinally aligned pairs paralleling the shaft 12 and are preferably spaced at 120 degree intervals. However this spacing may be varied as desired. It is to be noted that the slots in being located at spaced intervals progress longitudinally of the shaft 12, see Figure 1, and are arranged to form in section an equilateral triangle, see Figure 2, with the edges of the slots 18 paralleling an edge of the triangle. The slots 18 may be provided with an offset cutaway portion, as at 20, for reasons hereinafter more fully to appear.

Detachably positioned in each pair of circumferentially spaced slots is a scraper bar 24. The slots 18 are slightly wider than the thickness of the bars 24 to permit a slight transverse movement of the bars. As is clearly shown in the drawings one edge of each blade or bar 18 is chamfered to provide a cutting edge 26 and the end portions of the opposite edge are recessed or cut away to form shoulders 28 and 30. The shoulders 28 are adapted in assembly to frictionally engage adjacent portions of the fin 14 to maintain the blade in association therewith and also to prevent longitudinal movement of the blade 24 in relation to the fin 14. The shoulders 30 function to limit inward radial movement of the blades 24 when the apparatus is in operation. The central portion of the rear edge of each blade or bar 24 is preferably cut away as at 32 to lighten the member and also to limit the surface to which the frozen mix may adhere. An aperture 34 may be formed in the central portion of each blade 24 to assist the mixing operation and also to provide means for securing a leaf spring thereto as will hereinafter more fully appear.

Assembly and operation

As previously stated the improved device of this invention is periodically cleaned and steamed or otherwise sterilized after being disassembled. In being assembled for further use the blades or bars 24 are positioned in the slots 18 thereby slightly spreading the convolutions of the fin 14 so that the shoulders 28 frictionally engage the adjacent surface of the fin. The shoulders 30 limit the inward travel of the bars 24 so that the chamfered edges thereof project radially beyond the peripheral surface of the fin 14. See Figure 2. It is to be noted that the ends of the centrally positioned bar 24 overlap the adjacent ends of the outer bars, thus assuring complete cleaning of the freezer wall with each revolution of the shaft 12.

Now the assembly is positioned within the freezer, not shown, and operably secured. The device is now ready for operation. In operation the shaft 12, fin 14 and scraper blades 24 assembly is rotated in a clockwise direction as viewed in Figure 2. Now as the scraper blades 24 engage the frozen material on the interior wall of the freezer, the blades 24 are urged in a counterclockwise direction on their shoulders 30 whereby the chamfered edge 26 may, under operating conditions, bear against the interior surface of the freezer. The frozen mix removed from the wall is moved inwardly, some of it passing through the aperture 34 in the bar 24, and is there commingled with the material being agitated and moved in a forwardly direction by the revolving fin 14. As the material in the freezer is moved in a forward direction a head or pressure is formed in the discharge end thereof. This pressure is relieved and the assembly prevented from stalling by the spaced apertures 16 in the fin 14. These apertures also assist in the mixing operation by permitting some of the material to pass from the leading side of the fin to the trailing side thereof.

The mixing mechanism may be dismantled for cleaning by removing it from the freezer and then removing the scraper bars in any suitable manner, as for instance by removing first one end portion and then the other from its slot.

Modification A

The embodiment shown in Figures 4, 5, 6 and 7 comprises a shaft 12a, fin 14a and scraping blades or bars 24a precisely the same as in the previously described embodiment. These parts and the formations thereon are indicated in the drawings by the same reference numerals but to avoid confusion the exponent "a" has been added to the presently described embodiment.

In this embodiment means are provided for biasing the scraping bars 24a in a counterclockwise direction as viewed in Figure 4. The biasing means here illustrated takes the form of a leaf spring 40 having a central portion in the form of an open loop 42 and outwardly extending end portions 44. This loop 42 is adapted to be secured to a blade by inserting the loop 42 thereof through the aperture 34a, see Figures 5, 6 and 7, whereby the extending end portions 44 are beneath and spaced from the lower surface of the blade 24a. In assembly the end portions 44 of each spring 40 are sprung upwardly toward the blade and the extreme ends thereof are positioned in the offset cutaway portions 20a of the slots 18. See Figure 4. Thus the blades 24a are biased against the trailing edges of the slots 18a and toward the interior wall of the freezer. Consequently when the loaded machine is stopped the blades 24a are held in position so that upon resuming operation a ridge of frozen mix is not left adhering to the wall. The looped central portion of each leaf spring member 40 is contractible, thus the member may be easily separated from the blade 24a with which it may be associated. Thus cleaning and sterilizing may be thorough.

The assembly and operation of this embodiment is the same as the assembly and operation of the previously described embodiment, with the exception of the spring leaf 40. Accordingly a repetition of that description is not deemed necessary here.

Modification B

The structure shown in Figure 8 illustrates another means of biasing the scraping blades against the freezer wall. In this embodiment the suffix "b" has been added to the reference characters used to designate similar parts.

In this further embodiment a hole 50 is formed in the bottom of each slot 18b and a portion of a coil spring 52 is positioned therein. The remainder of the spring 52 extends radially outwardly, but within the slot 18b, see Figure 8, to bias the blade 24b toward the freezer wall. These springs 52 may be easily removed for cleaning and steaming. In all other respects this embodiment is assembled and functions in the same manner as the other described embodiments.

It will be apparent from the foregoing that herein is provided a durable and sturdy mixing and extruding mechanism for a dispensing freezer consisting of but relatively few coacting parts. Moreover the parts may be assembled without special tools or equipment and when assembled be so maintained without screws, bolts, pins and the like.

It will also be apparent to those skilled in the art that various changes and alterations may be made from the illustrative embodiments shown without departing from the spirit or scope of the invention as set forth and defined in the annexed claims.

I claim:

1. In a dispensing freezer having a chamber with an interior wall, a mixing and delivering mechanism comprising a rotatable shaft, a helical fin secured to said shaft, a plurality of slots formed in the peripheral edge of said fin which are arranged in axially aligned pairs with one pair circumferentially spaced from another, scraper blades movably mounted in each of said spaced apart pairs of slots having outer wall engaging edges and inner edges, said slots being slightly wider at their outer ends than the thickness of said blades and having forward sides and trailing sides which, with respect to the direction of rotation of said shaft, lie in planes directed outwardly in advance of a radius from said shaft through the inner edges of said blades, and springs mounted on said fins having free end portions engaging said blades in each of said slots for biasing said blades toward said trailing sides of said slots to thereby urge the outer edges of said blades toward forwardly directed scraping engagement with the interior wall of the freezer during rotation of said shaft.

2. In a dispensing freezer having a chamber with an interior wall, a mixing and delivering mechanism comprising a rotatable shaft, a helical fin secured to said shaft, a plurality of slots formed in the peripheral edge of said fin which are arranged in axially aligned pairs with one pair circumferentially spaced from another, scraper blades movably mounted in each of said spaced apart pairs of slots having outer wall engaging edges and inner edges, said slots being slightly wider at their outer ends than the thickness of said blades and having forward sides and trailing sides which, with respect to the direction of rotation of said shaft, lie in planes directed outwardly in advance of a radius from said shaft through the inner edges of said blades, and springs mounted in said slots for biasing said blades outwardly between the sides of said slots to thereby urge the outer edges of said blades toward forwardly directed scraping engagement with the interior wall of the freezer during rotation of said shaft.

3. In a dispensing freezer having a chamber with an interior wall, a mixing and delivering mechanism comprising a rotatable shaft, a helical fin secured to said shaft, a plurality of slots formed in the peripheral edge of said fin which are arranged in axially aligned pairs with one pair circumferentially spaced from another, scraper blades movably mounted in each of said spaced apart pairs of slots having outer wall engaging edges and inner edges, said slots being slightly wider at their outer ends than the thickness of said blades and having forward sides and trailing sides which, with respect to the direction of rotation of said shaft, lie in planes directed outwardly in advance of a radius from said shaft through the inner edges of said blades, and springs mounted in each of said slots between said leading sides thereof and said blades for biasing said blades toward said trailing sides of said slots to thereby urge the outer edges of said blades toward forwardly directed scraping engagement with the interior wall of the freezer during rotation of said shaft.

4. In a dispensing freezer having a chamber with an interior wall, a mixing and delivering mechanism comprising a rotatable shaft, a helical fin secured to said shaft, a plurality of slots formed in the peripheral edge of said fin which are arranged in axially aligned pairs with one pair circumferentially spaced from another, scraper blades movably mounted in each of said spaced apart pairs of slots having outer wall engaging edges and inner edges, said slots being slightly wider at their outer ends than the thickness of said blades and having forward sides and trailing sides which, with respect to the direction of rotation of said shaft, lie in planes directed outwardly in advance of a radius from said shaft through the inner edges of said blades, and leaf springs mounted in each pair of slots and engaging said blades to bias same toward said trailing sides of said slots to thereby urge the outer edges of said blades toward forwardly directed scraping engagement with the interior wall of the freezer during rotation of said shaft, said leaf springs and blades having cooperating means which engage one another to detachably secure said blades in said slots.

5. In a dispensing freezer having a chamber with an interior wall, a mixing and delivering mechanism comprising a rotatable shaft, a helical fin secured to said shaft, a plurality of slots formed in the peripheral edge of said fin which are arranged in axially aligned pairs with one pair circumferentially spaced from another, scraper blades movably mounted in each of said spaced apart pairs of slots having outer wall engaging edges and inner edges, said slots being slightly wider at their outer ends than the thickness of said blades and having forward sides and trailing sides which, with respect to the direction of rotation of said shaft, lie in planes directed outwardly in advance of a radius from said shaft through the inner edges of said blades, said blades being thereby mounted for slight transverse movements in said slots during rotation of said shaft to bring their outer edges into forwardly directed scraping engagement with the interior wall of the freezer, said blades having offset portions on their inner edges formed to frictionally engage adjacent aligned portions of said helical fin to detachably wedge said blades in said slots between said adjacent aligned portions of said helical fin.

6. In a dispensing freezer having a chamber with an interior wall, a mixing and delivering mechanism comprising a rotatable shaft, a helical fin secured to said shaft, a plurality of slots formed in the peripheral edge of said fin which are arranged in axially aligned pairs with one pair circumferentially spaced substantially 120° from another, scraper blades movably mounted in each of said spaced apart pairs of slots having outer wall engaging edges and inner edges, said slots being slightly wider at their outer ends than the thickness of said blades and having forward sides and trailing sides which, with respect to the direction of rotation of said shaft, lie in planes directed outwardly in advance of a radius from said shaft through the inner edges of said blades, the planes of the trailing sides of a pair of slots forming an equilateral triangle with corresponding planes of adjacent circumferentially spaced pairs of slots when viewed axially of said shaft, said blades being thereby mounted for slight transverse movements in said slots during rotation of said shaft to bring their outer edges into forwardly directed scraping engagement with the interior wall of the freezer.

HARRY M. OLTZ.

REFERENCES CITED

The following references are of record in the file of this patent:

UNITED STATES PATENTS

| Number | Name | Date |
| --- | --- | --- |
| 172,475 | Packer | Jan. 18, 1876 |
| 372,393 | Tunstill | Nov. 1, 1887 |
| 683,042 | Harrison | Sept. 25, 1901 |
| 816,652 | Dunne et al. | Apr. 3, 1906 |
| 2,030,969 | Cushman | Feb. 18, 1936 |
| 2,080,971 | Oltz | May 18, 1937 |
| 2,188,551 | Kaltenbach et al. | Jan. 30, 1940 |
| 2,211,387 | Routh | Aug. 13, 1940 |
| 2,282,298 | Vogel | May 5, 1942 |